May 6, 1952  A. P. HILDRED  2,595,258
FLUID PRESSURE ACTUATED TIRE-CHANGING DEVICE WITH
CIRCUMFERENTIALLY DISTRIBUTED THRUST MEMBERS
Filed Sept. 28, 1946  3 Sheets-Sheet 1
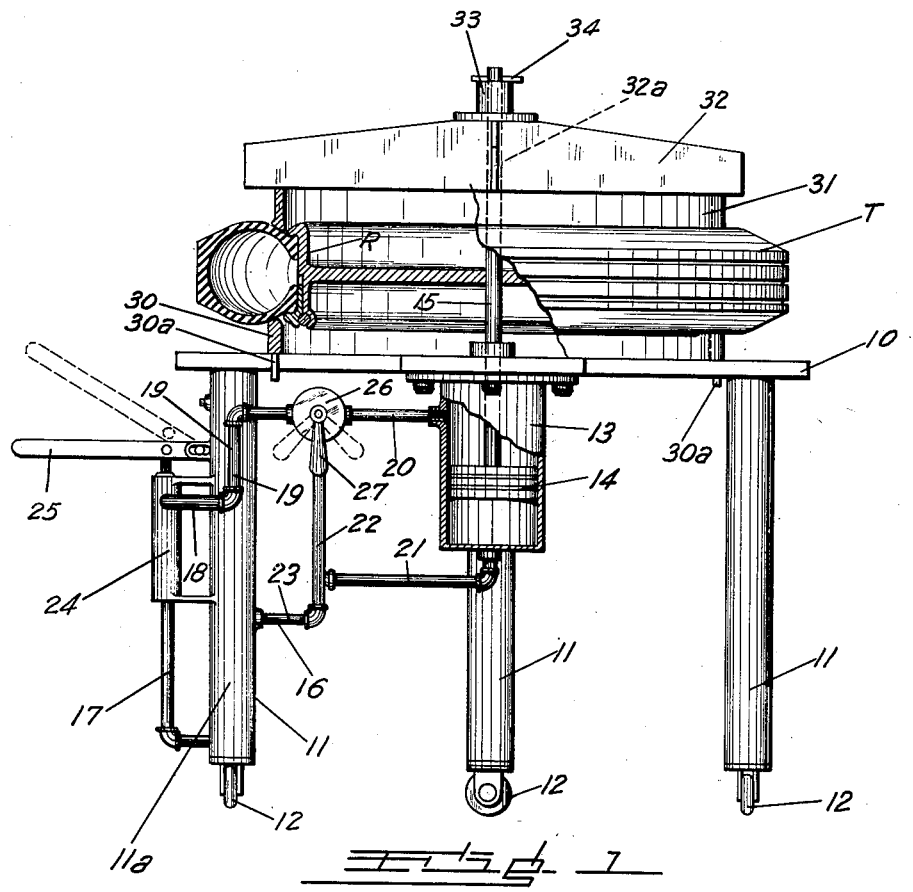
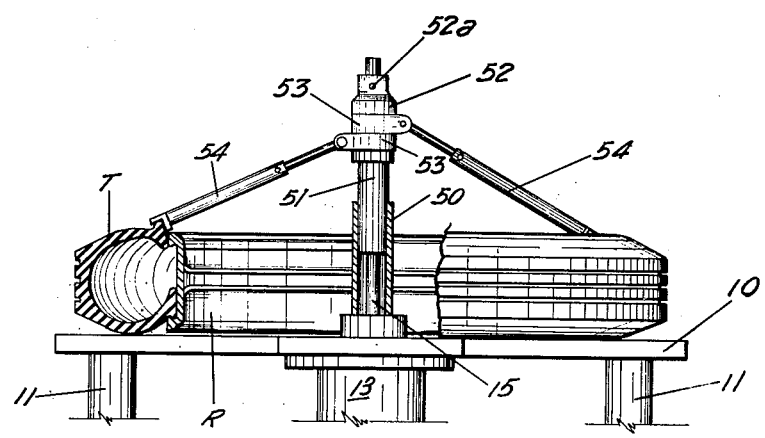
INVENTOR.
Albertis P. Hildred
BY
*A. A. McGrew*
ATTORNEY

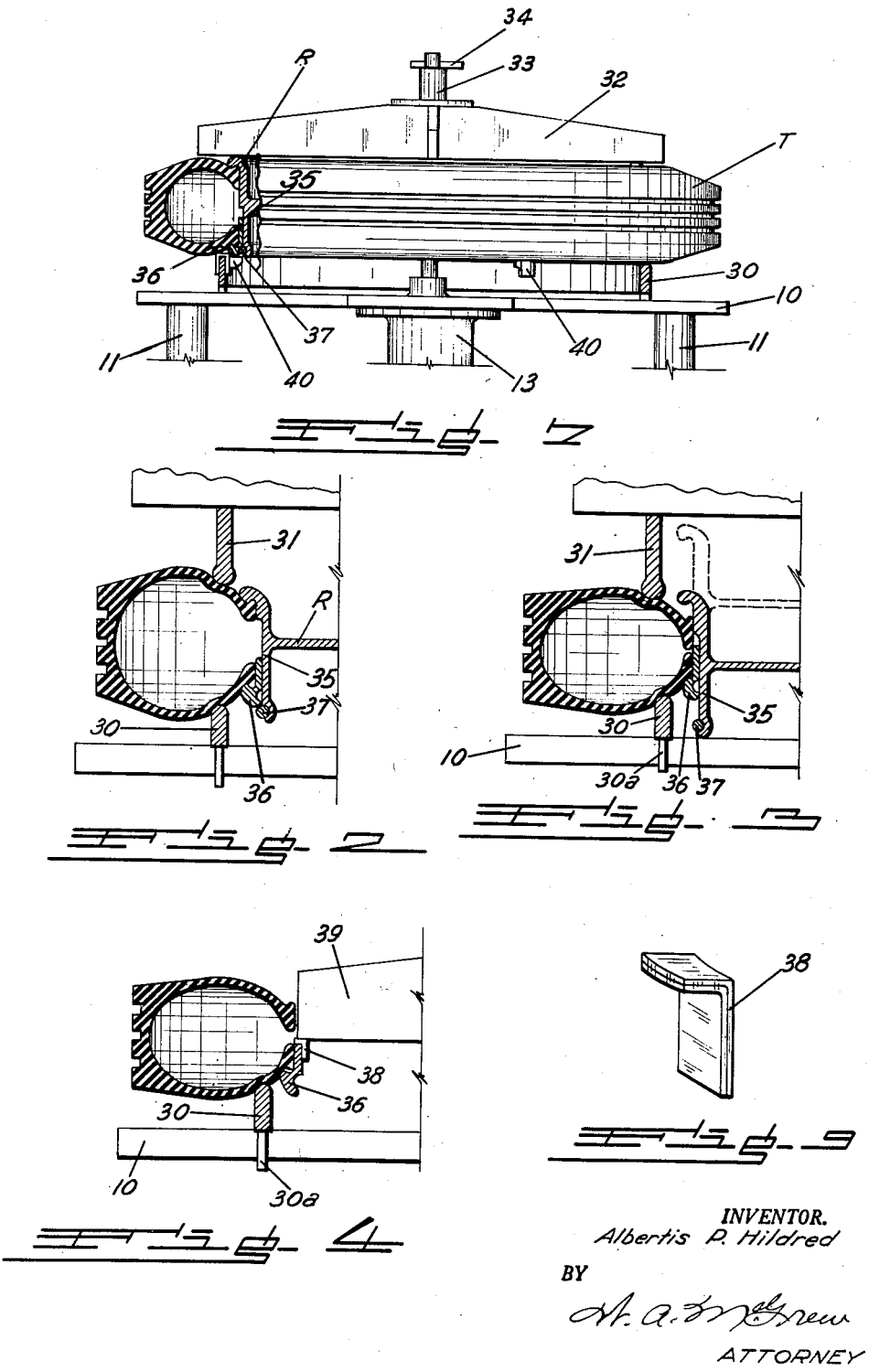

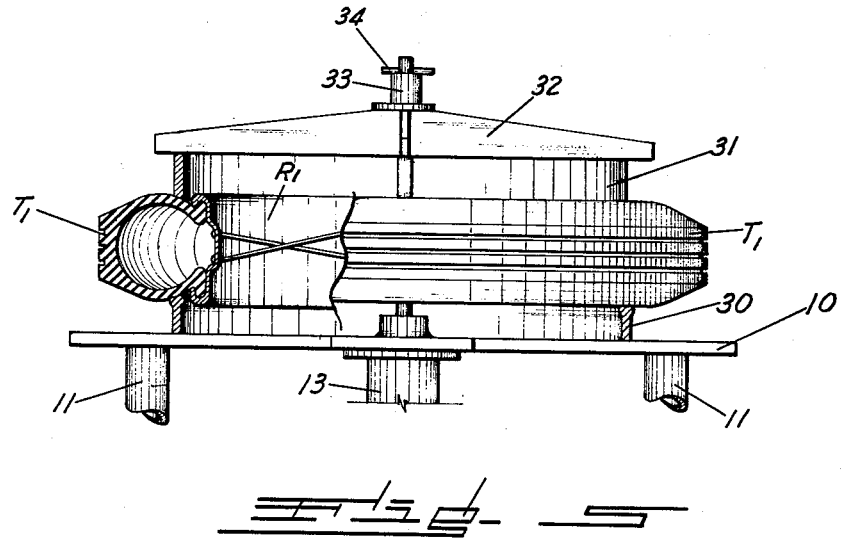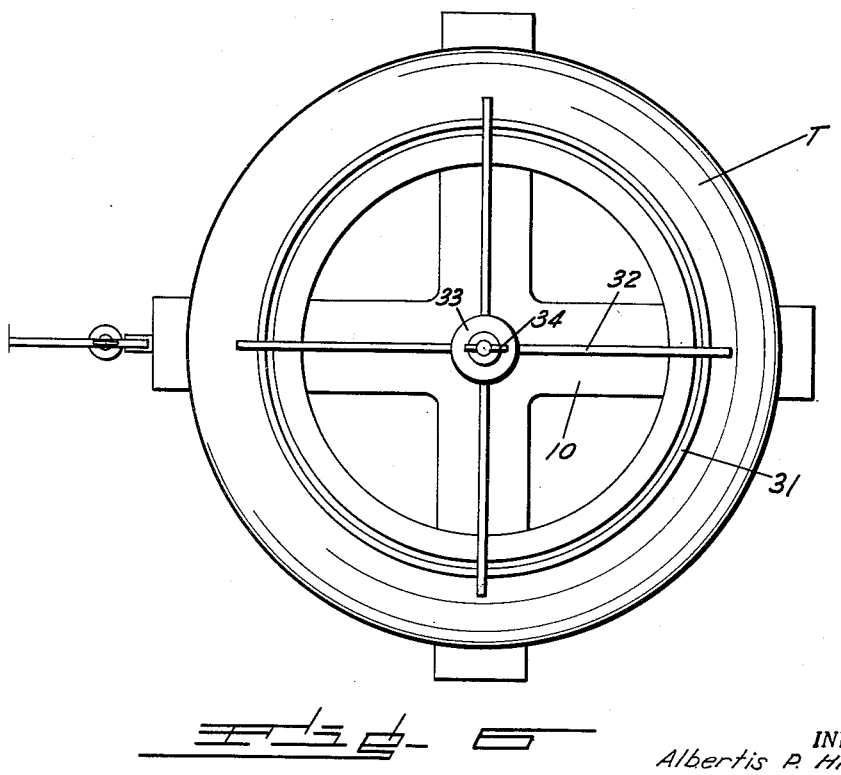

Patented May 6, 1952

2,595,258

UNITED STATES PATENT OFFICE 2,595,258

FLUID PRESSURE ACTUATED TIRE-CHANGING DEVICE WITH CIRCUMFERENTIALLY DISTRIBUTED THRUST MEMBERS

Albertis P. Hildred, Platteville, Colo.

Application September 28, 1946, Serial No. 700,042

2 Claims. (Cl. 157—1.2)

The present invention relates to a machine or apparatus for demounting and/or mounting tires and rims. It has to do, particularly, with a machine or apparatus with which a mounted tire, usually of the pneumatic type and of extremely large size, such as for tractors, trucks, and aircraft, may be associated, to remove the rim from the tire after the latter has, of course, been deflated, which operation when performed by hand as is the usual procedure, is a very difficult and tedious one, requiring considerable time and often causing damage to the sidewalls and/or beads of the tires and sometimes to the rims.

Heretofore, it has been the common practice, particularly at army air fields and navy aircraft bases, to remove aircraft tires from their rims by the use of sledge hammers, often causing serious damage to the tire being removed and rendering it unfit for further use. The matter of remounting the used tire or mounting a new tire also involved the use of a sledge hammer. Very often the application of hard blows to a good tire by the sledge hammer, broke down the side wall fabric of the tire. Even though the break may have been on the inside of the tire casing thus invisible, the thus weakened tire was rendered unfit for further use. If the hidden break in the casing were not discovered and the damaged tire reused, an accident in landing, or even taking off might occur.

Generally speaking, the present invention relates to a relatively simple, compact and inexpensive machine or apparatus capable of use in either mounting or demounting tires, preferably of the pneumatic type and of varying sizes, particularly those of extremely large size, such as are used on tractors, aircraft, trucks, and the like. The structure of the machine or apparatus is such that a mounted tire and its rim may be placed in position on a supporting table and a force or power applied to the tire to shift it relatively to its supporting rim and to release or separate the two mechanically and with relative ease and facility. One source of power which may be used is a hydraulic system in which one or more of the supporting uprights for the tire and rim receiving table or platform serves the dual function of a hydraulic fluid containing cylinder or reservoir. Some other suitable source of power, such as compressed air, may be employed, whereby it is possible to either release a tire or casing from its rim, or mount a tire or casing upon its rim.

One of the objects of the present invention is to provide a new and novel machine or apparatus capable of quickly demounting or mounting tires and rims to thus entirely eliminate the heretofore common practice of pounding or hammering the tire with a heavy object, such as a sledge hammer, to either release or remove the tire which has become stuck to its rim, or to apply or mount a tire upon a rim.

Another object of the present invention is to provide a machine or apparatus of the foregoing character having interchangeable parts permitting the same machine to be used in either the operation of demounting a tire from its rim or the operation of mounting a tire upon its rim.

A further object is to provide a machine or apparatus of the foregoing character which is preferably hydraulically operated and which may be of portable nature, permitting it to be moved from place to place with ease and facility.

The foregoing and other objects and advantages of the present invention will appear from the following description and appended claims when considered in connection with the accompanying drawings forming a part of this specification wherein like reference characters designate corresponding parts in the several views.

In said drawings:

Fig. 1 is a side elevational view, partly in section and partly broken away, of one form of machine or apparatus embodying the present invention.

Fig. 2 is a fragmentary enlarged vertical sectional view illustrating the beginning of the action of removing a tire from a rim by the machine or apparatus of Fig. 1.

Fig. 3 is a view similar to Fig. 2, illustrating a further step in the operation of removing the tire from its supporting rim.

Fig. 4 is a view generally similar to Figs. 2 and 3 illustrating another step in the operation of removing a portion of the rim from a tire.

Fig. 5 is a fragmentary view generally similar to Fig. 1, showing the use of the machine or apparatus of the invention for demounting a tire from a different type of rim.

Fig. 6 is a top plan view of the structure shown in Fig. 1.

Fig. 7 is a view similar to Fig. 5, illustrating the use of the apparatus with slightly different accessories and interchangeable parts for applying a tire to a rim, generally similar to that shown in Figs. 2 and 3.

Fig. 8 is a fragmentary side elevational view, partly in section and partly broken away, of the apparatus or machine of the present invention shown as being used to mount a tire on a clincher type of rim; and Fig. 9 is a perspective view, on an enlarged scale, of the lug shown in Fig. 4.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the drawings and particularly to Figs. 1 to 4, inclusive, and 9, there is shown in these figures one preferred embodiment of the present invention which is adapted particularly for the power demounting or mounting of preferably pneumatic tires of large size, which completely replaces the usual hand manipulation or operation of hammering or pounding the tire loose from its rim, or onto its rim.

The machine or apparatus, as a whole, is shown in Fig. 1 and comprises a preferably cross-shaped platform, table or support 10 mounted upon hollow upright legs 11 which are provided with casters or rollers 12. Mounted beneath the central portion of the platform or table is a hydraulic cylinder 13 provided with a reciprocable piston 14 mounted upon an upwardly projecting stem 15. The hydraulic cylinder 13 forms a part of a hydraulic system, indicated as a whole at 16. The system includes a storage chamber or reservoir 11a provided by the hollow leg 11 at the left of Fig. 1 which is connected, by suitable pipes 17, 18, 19, 20, 21, 22 and 23, to the cylinder 13 at opposite sides of piston 14, to a manually operated pump or pumping cylinder 24 having a handle 25 and to a four-way fluid control valve 26 having an operating or control handle 27. Thus the hollow supporting leg 11a, cylinder 13 and piston 14, pumping cylinder or chamber 24 and four-way valve 26 are all connected together by the various sections of pipe or conduit to provide the entire or complete hydraulic system. Should pressure drop in the hydraulic system, it can be built up by actuating the handle 25 of pump chamber or cylinder which serves to reciprocate a plunger or piston (not shown) within the chamber 24.

With reference to the application of a mounted tire with its rim to the machine or apparatus of Figs. 1 to 4, inclusive, 6 and 9, it will be noted that a lower pressure ring or member, such as that shown at 30, is applied to the table or platform 10 and preferably held in place by pins or dowels 30a which extend through openings formed in the platform. The tire and rim shown in Fig. 1 are then placed upon the lower pressure ring 30, after which an upper pressure ring or member 31 is placed in position to engage the adjacent or upper side wall of the tire.

A top cross member 32 having a bore 32a in its hub portion is then slipped over the stem 15 and moved into contact with and to rest upon the upper pressure ring 31. A cap piece 33 having a central bore is slipped over the upper end of stem 15 and rests upon the cross member 32, see Fig. 1. The cap piece 33 is held in place in contact with the member 32 and on the stem 15 by means of a removable pin or key 34.

It will be seen that the rim of Figs. 1 to 4 inclusive, comprises a main cylindrical rim portion 35, a removable clincher rim portion 36, and a locking ring 37 preferably of round cross section which serves to normally lock the rim parts 35 and 36 together when the tire is properly inflated and mounted upon its rim.

With the parts in the position shown in Fig. 1, hydraulic pressure is admitted to the upper side of piston 14 through pipe 20, under the control of valve 26. This pressure forces the piston downward in cylinder 13 causing pressure by the rings 31 and 30 on opposite side walls of the tire T. Such application of force or pressure causes the clincher rim portion to be released from the lock ring 37, until the parts assume the position, under initial pressure, as shown in Fig. 2, and by the application of additional pressure, the position as shown in Fig. 3. In the position shown in Fig. 3, locking ring 37 can be manually removed and the rim raised to the dotted line position by a hoist to free it from the tire casing and clincher rim portion 36. The valve 26 is now operated by its control handle 27 to admit fluid pressure through pipes 22 and 21 to the under side of piston 14 to force the same upwardly in its cylinder, thus relieving pressure upon the tire casing walls. The pin 34 may now be removed, after which the cap piece 33 and cross member 32 and upper pressure ring 31 are removed. The main or cylindrical rim portion 35 may then be removed upwardly, to remove it entirely from the casing or tire T. For this purpose a hoist may be used to avoid manual handling.

In the event the clincher portion 36 of the rim sticks to the lower bead or portion of the tire, a series of lugs, such as the lug 38 of Figs. 4 and 9, may be applied to the rim sections, as shown in Fig. 4. Thereafter, a substitute cross member 39, generally like the member 32 but of smaller size, is applied in such a manner that its outwardly projecting legs will each engage one of the lugs 38. Downward pressure, through the medium of the hydraulic means described above will cause the lower pressure ring 30 to force the tire bead free of the clincher rim portion 36.

In Fig. 5 of the drawings the apparatus is shown being used to free a clincher type tire or casing from a drop-center type of rim. The machine or apparatus of Fig. 5 corresponds to that of Fig. 1 and its description need not be repeated at this point. It will be understood that a procedure such as I have described above will generally be followed to free the tire of Fig. 5 from its rim. Since, however, the rim $R_1$ of Fig. 5 is a one piece rim, it will be unnecessary to employ lugs such as those shown at 38 in Figs. 4 and 9.

In Fig. 7 the apparatus is shown being used for mounting a tire on a three-part rim $R_2$ like the rim and wheel assembly R of Fig. 1, the present apparatus, however, not utilizing the upper pressure ring, such as the ring 31 but allowing the cross member 32 to rest directly upon the adjacent bead or flange of the rim R. In assembling the parts as seen in Fig. 7, the ring 30 is placed on table 10 with pins 30a resting on the table to provide extra clearance. Lugs 40 are then placed on ring 30, after which the removable rim portion 36a is placed on the lugs 40. Snap ring 37 is now laid on the table inside the ring 30. The tire T partially inflated is then lifted into place by a hoist to rest upon and be centered by the rim portion 36. The wheel and rim assembly R is now lifted by the hoist and dropped into place within the tire. The cross member 32 is now dropped into place onto the rim and wheel assembly.

When pressure is applied in a downward direction, the rim portion 35 is forced downwardly as the lugs 40 hold the removable rim portion 36, until sufficient space is provided to permit the locking ring 37 to be snapped into place manually in the annular groove 37a in rim portion 37 to hold the parts together. It will be understood that hydraulic pressure is controlled by the valve 26 for actuating the parts shown in Fig. 7 in much the same manner as in the preceding forms of the invention.

Another adaptation of the machine or apparatus of the present invention is illustrated in Fig. 8 of the drawings. In this form, a tire shown partially mounted upon a rim, is positioned upon a platform or table 10. As shown, a guide tube or sleeve 50 is applied to the hydraulic apparatus to surround the piston stem 15. A sleeve-like hub member 51 is slipped over the upper end of the stem 15 and finds a guide in sleeve 50. The member 51 carries a collar 52 which is pinned or keyed at 52a to stem 15 and to which a pair of bands 53 are clamped. Each of the bands 53 carries a hingedly mounted pusher arm 54. The hydraulic system in the form shown in Fig. 8 is substantially the same as shown in Fig. 5. Therefore, it will be understood that when hydraulic pressure enters cylinder 13 above the piston (not shown) the stem 15 is forced downwardly, pulling the members 54 downwardly and outwardly. Since the outer ends of the members 54 are in engagement with a tire bead, it will be seen that this bead will be forced onto the rim and into locking position with the flange of said rim. If necessary, both beads of the tire may be applied to the rim in the manner just described. Moreover, if desirable, two, three, or more of the members 54 may be employed to apply pressure simultaneously to different points of the continuous tire bead.

From the foregoing it will be seen that the present invention embraces, in several forms, an improved apparatus or machine for assisting in mounting or demounting tires of various sizes, particularly those of extra large size, such as used on tractors, trucks, and aircraft. The machine may be converted quickly and easily from a tire mounting setup to a tire demounting arrangement, by the mere interchange of parts which are standard equipment of the machine or apparatus embracing the present invention.

The apparatus of the present invention, in its various forms, is a labor-saving device and avoids the usual manual handling of the heavy tires and rims by permitting them to be handled by a suitable hoist or crane.

Having thus described the invention what is claimed is:

1. A tire changing apparatus for use on tires having a casing mounted on separable rim portions comprising a horizontal table, a plurality of legs supporting said table, a cylinder mounted below said table adjacent the central portion, a piston mounted within said cylinder, a piston rod connected to said cylinder and extending upwardly through said table, a source of hydraulic fluid under pressure connected to the upper and lower portions of said cylinder and means selectively controlling the flow of hydraulic fluid to the upper or lower portion of said cylinder, a cross frame adapted to be detachably connected to the free end of said piston rod, a lower ring adapted to rest on said table and engage the lower portion of a tire casing, an upper ring interposed between said cross frame and the upper portion of a tire casing, said upper ring providing sufficient space for the upward movement of one of said rim portions to free it from the casing and the other rim portion, and a plurality of detachable lugs adapted to be mounted on said lower ring and having inwardly extending flanges to engage the bottom edge of said other rim portion for movement relative to said one rim portion.

2. A tire changing apparatus for use on tires having a casing mounted on separable rim portions comprising a horizontal table, a plurality of legs supporting said table, a cylinder mounted below said table adjacent the central portion, a piston mounted within said cylinder, a piston rod connected to said cylinder and extending upwardly through said table, a source of hydraulic fluid under pressure connected to the upper and lower portions of said cylinder and means selectively controlling the flow of hydraulic fluid to the upper or lower portion of said cylinder, a cross frame adapted to be detachably connected to the free end of said piston rod, a lower ring adapted to rest on said table and engage the lower portion of a tire casing, said cross frame being slightly smaller than the inside diameter of the tire casing and being provided with lugs having outwardly extending flanges adapted to engage the top edge of a rim portion for movement relative to the tire.

ALBERTIS P. HILDRED.

REFERENCES CITED

The following references are of record in the file of this patent:

UNITED STATES PATENTS

| Number | Name | Date |
|---|---|---|
| 1,003,030 | Burt | Sept. 12, 1911 |
| 1,481,061 | Hunter | Jan. 15, 1924 |
| 1,498,299 | Rollins | June 17, 1924 |
| 1,564,092 | Miller | Dec. 1, 1925 |
| 1,667,351 | Levitt | Apr. 24, 1928 |
| 2,043,169 | Hawkinson | June 2, 1936 |
| 2,373,975 | Plumeau et al. | Apr. 17, 1945 |
| 2,418,849 | Polt | Apr. 15, 1947 |
| 2,469,723 | Greene | May 10, 1949 |